(12) United States Patent
Neubauer

(10) Patent No.: US 7,048,484 B2
(45) Date of Patent: May 23, 2006

(54) METHOD OF SHIPPING AND STORING REMOVABLE TREAD BELTS FOR VERY LARGE TIRES

(75) Inventor: Robert Anthony Neubauer, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/947,722

(22) Filed: Sep. 23, 2004

(65) Prior Publication Data

US 2006/0062648 A1   Mar. 23, 2006

(51) Int. Cl.
*B60P 7/08* (2006.01)

(52) U.S. Cl. .............................. 410/98; 410/97; 410/34; 410/43; 410/48

(58) Field of Classification Search .................. 410/20, 410/34, 36, 43, 48, 50, 97–98; 100/3, 8, 100/12; 152/173–176, 186–189; 206/303, 206/304, 304.1, 597, 304.2; 53/204, 399, 53/409, 436, 438, 528, 529, 582
See application file for complete search history.

(56) References Cited

U.S. PATENT DOCUMENTS

| | | | |
|---|---|---|---|
| 1,510,159 A * | 9/1924 | Powell | |
| 2,659,484 A | 11/1953 | Averill | 206/65 |
| 2,690,253 A | 9/1954 | Francois | 296/45.33 |
| 3,012,663 A | 12/1961 | Thorne | 206/65 |
| 3,619,966 A | 11/1971 | Goldsberry | 53/3 |
| 3,822,526 A | 7/1974 | Black | 53/124 D |
| 3,850,295 A | 11/1974 | Black | 206/304 |
| 3,897,814 A | 8/1975 | Grawey | 152/361 R |
| 3,942,637 A | 3/1976 | Glennie | 206/389 |
| 4,057,141 A * | 11/1977 | Laurie et al. | |
| 4,150,745 A * | 4/1979 | Williams et al. | |
| 4,314,597 A | 2/1982 | Zrostlik et al. | 157/1.11 |
| 4,550,827 A | 11/1985 | Watts et al. | 206/304 |
| 4,623,010 A | 11/1986 | Takahashi | 152/450 |
| 4,678,084 A | 7/1987 | Maker et al. | 206/386 |
| 5,056,662 A | 10/1991 | Lasenby et al. | 206/395 |
| 5,201,427 A | 4/1993 | Dowty | 211/23 |
| 5,321,931 A | 6/1994 | Bluteau | 53/435 |
| 5,544,578 A | 8/1996 | Keller et al. | 100/1 |
| 5,584,622 A | 12/1996 | Dickerson, Sr. | 410/21 |
| 5,816,142 A | 10/1998 | Keller et al. | 100/35 |
| 5,888,039 A * | 3/1999 | Cooley | 410/50 |
| 6,095,731 A | 8/2000 | Minakami et al. | 410/20 |
| 6,186,713 B1 * | 2/2001 | Bonerb | 410/100 |
| 6,324,814 B1 | 12/2001 | Rayman | 53/399 |
| 6,357,498 B1 | 3/2002 | Rayman | 152/167 |
| 6,526,659 B1 | 3/2003 | Rayman | 29/894.37 |
| 6,532,718 B1 | 3/2003 | Rayman | 53/399 |

* cited by examiner

*Primary Examiner*—Stephen Gordon
(74) *Attorney, Agent, or Firm*—June E. Rickey

(57) ABSTRACT

An improved method of shipping and storing tires having a removable tread belt mounted to a tire carcass which are typically used on large vehicles such as earthmovers. The method includes shipping the tread belt separately from the tire carcass; and holding two opposite sides of the tread belt in mating engagement during shipping.

2 Claims, 2 Drawing Sheets

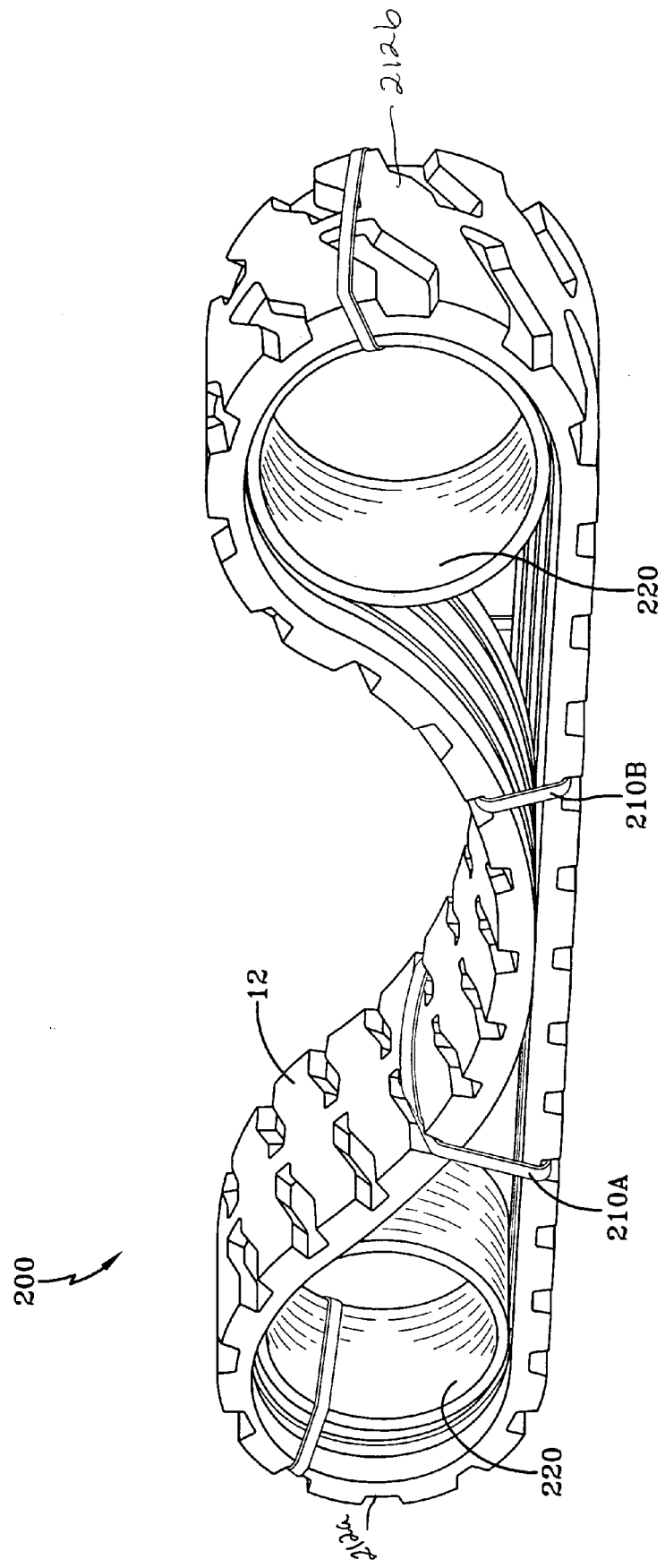

METHOD OF SHIPPING AND STORING REMOVABLE TREAD BELTS FOR VERY LARGE TIRES

TECHNICAL FIELD OF THE INVENTION

This invention relates to a method for shipping and storing removable tread belts for use with very large pneumatic tires typically for use with very large vehicles such as earthmoving vehicles.

BACKGROUND OF THE INVENTION

Removable tread belt pneumatic tires, which are the subject of the method of the present invention, are typically very large tires having a 10 foot outside diameter (OD). These very large tires are designed for use on very large vehicles, generally off-the-road (OTR) vehicles such as earthmovers and large-capacity mining trucks (e.g., 300 short tons or more). As modern construction vehicles have evolved to larger and larger sizes, their tires have also grown to the point where conventional shipping of the tires becomes difficult. For example, an existing design of a 360-ton truck requires pneumatic tires having a 150 to 154 inch diameter, which is considered to be the maximum size tire reasonably possible to ship by conventional means in the United States. Tire weight is another consideration, as very large tires can weigh 8,000 to 15,000 pounds or more per un-mounted tire.

When pneumatic tires become so large that they cannot be shipped by conventional means, one solution to this problem is to utilize a two piece tire wherein the tire tread belt is removable from the tire carcass. For example, see U.S. Pat. No. 6,357,498 entitled TIRE WITH REMOVEABLE TIRE TREAD BELT AND IMPROVED APEX DESIGN, having a common assignee with the present invention, which discloses a tire having an improved removable tire tread belt for use on large earthmover vehicles. The use of a two piece tire design produces significant weight and size reductions, thereby allowing the use of conventional shipping means.

Thus, there is still a need for an improved method of shipping very large tires that allows for the employment of more conventional shipping means, and that reduces the work site storage requirements as well.

SUMMARY OF THE INVENTION

According to a first aspect of the invention, a spacer is provided for the compressed tread belt forming the tread belt into an elongated straight-sided oval shape.

According to another aspect of the invention, the tire carcass may also be held in a compressed state for shipping.

Other objects, features and advantages of the invention will become apparent in light of the following description thereof.

BRIEF DESCRIPTION OF THE DRAWINGS

The structure, operation, and advantages of the present preferred embodiment of the invention will become further apparent upon consideration of the following description taken in conjunction with the accompanying drawings, wherein:

FIG. 2 is a side view of a tread belt prepared for shipping, according to the invention.

DEFINITIONS

Figure 1:
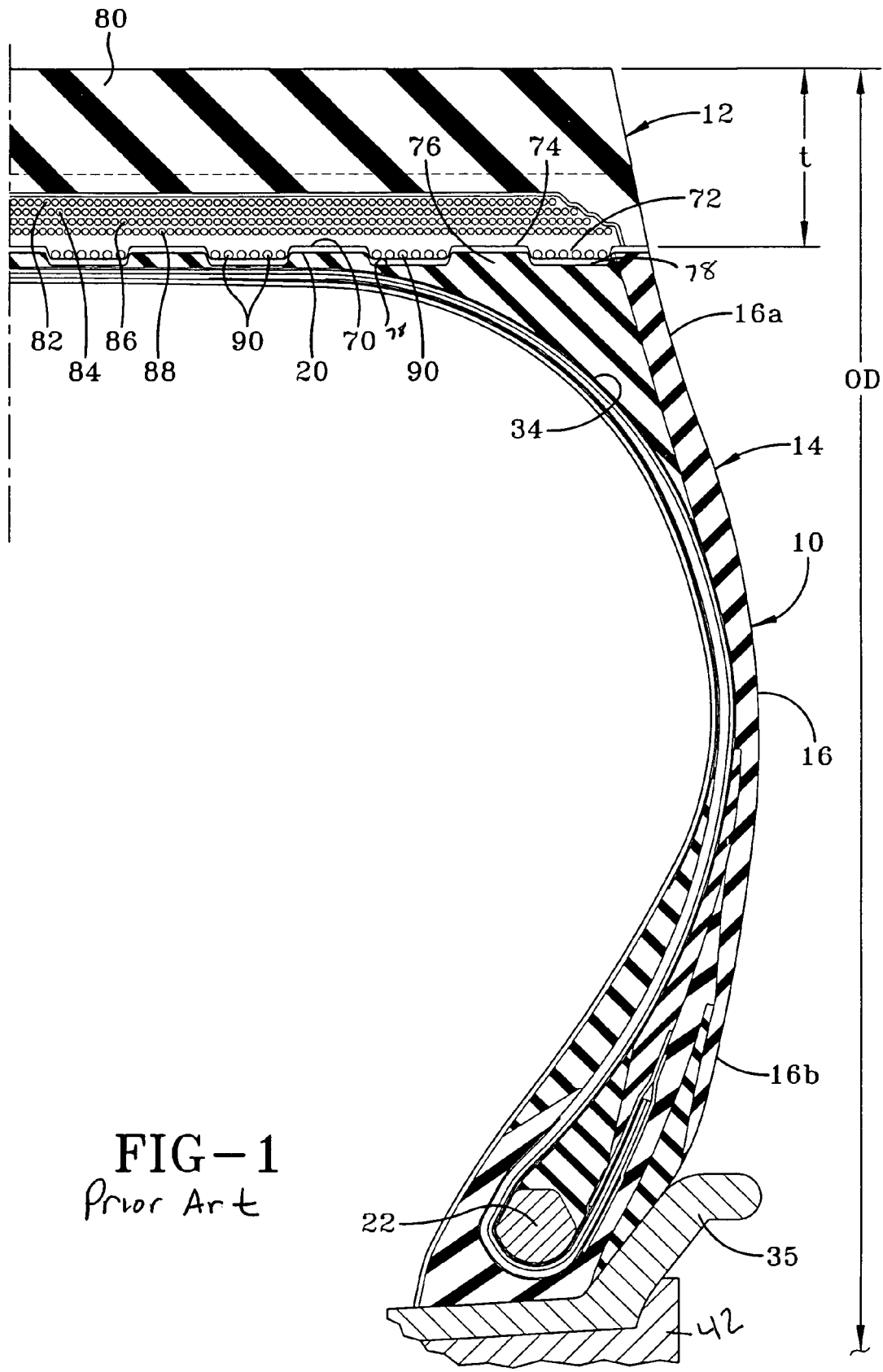
FIG. 1 is a cross-sectional view illustrating half of a removable tread belt pneumatic tire.

"Bead" means that part of the tire comprising an annular tensile member wrapped by the ply cords and shaped, with or without other reinforcement elements such as flippers, chippers, apexes, toe guards and chafers, to fit the wheel rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about 25°–50° angle with respect to the equatorial plane of the tire. Cords run at opposite angles in alternate layers.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Footprint" means the contact patch or area of contact of the tire tread with a flat surface under load and pressure.

"Lateral" and "laterally" means lines or directions that are parallel to the axis of rotation of the tire (also "axial").

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial and "radially" means directions extending radially toward or away from the axis of rotation of the tire.

"Radial-ply tire" means a belted or circumferentially-restricted pneumatic tire in which the ply cords which extend from bead to bead are laid at cord angles between 65 degrees and 90 degrees with respect to the equatorial plane of the tire.

"Zero-degree wires" means at least one layer of parallel cords (usually metal wire), underlying the tread, unanchored to the bead, spiraling circumferentially around the tread, and having cord angles in the range from 0 degrees to 5 degrees with respect to the equatorial plane of the tire.

DETAILED DESCRIPTION OF THE INVENTION

The method of this invention utilizes a tread belt version of a very large tire, such as tires greater than 10 feet in diameter as used on earthmover-type very large vehicles. The method is not dependent on a particular design for the removable tread belt and carcass. Although a specific very large tire design is described hereinbelow for illustrating the embodiment of this inventive method, the inventive method should not be limited to this particular tire design.

FIG. 1 illustrates a cross-section of a portion of a very large tread belt pneumatic tire 10 which in the specific embodiment illustrated is a size 70/68R63 earthmover tire. The size 70/68R63 tire has a 162-inch maximum inflated outside diameter (OD), a 70.0-inch maximum inflated width in the axial direction, and a nominal bead diameter of 63 inches. The tread belt 12 has a thickness (t) of approximately 10 inches (254 cm), and a width of approximately 65 inches (1,651 cm). The assembled tire 10 weighs 16,000 pounds (7,256 kg), of which approximately 8,000 pounds (3,628 kg) are in the removable tread belt 12. The tire carcass 14 is typically inflated to a pressure of about 100 pounds per square inch (686 kPa) with air and sometimes with an air/nitrogen mixture. The very large tread belt pneumatic tire 10 includes a ground engaging, circumferentially extending tread belt 12 mounted on a radially reinforced, beaded tire carcass 14. The beaded tire carcass 14 generally includes a pair of tire sidewalls 16 extending radially inwardly from the outer circumferential surface 20 of the tire carcass 14 and terminating at a pair of bead wires 22. The sidewalls 16 each have an upper portion 16*a* in the shoulder region of tire carcass 14 and radially outward of the maximum section width of the tire carcass 14, and a lower portion 16*b*, adjacent the bead wires 22, and radially inward of the maximum section width of the tire carcass 14.

Most details of the tire carcass 14 construction are not relevant to the method of this invention, and will not be described other than to note that the carcass 14 generally contains at least one rubberized laminated ply layer 34 of tire cord fabric. The carcass 14 mounts on the wheel mounting rim 42, pneumatically sealing in the area of the bead 22 against, and held in place by, the flange 35, which is generally removable from the rim 42 on wheels used for very large tires 10.

An optional feature is generally included in removable tread belt tires 10 in order to assist in holding the removable tread belt 12 in place on the carcass 14. This optional feature, illustrated in FIG. 1, comprises a set of one or more grooves 78 and one or more lands 76 formed in the outer circumferential surface 20 of the carcass 14.

The ground engaging, circumferentially extending tread belt 12 is removably mounted onto the tire carcass 14. At a minimum, the tire tread belt 12 comprises a tread portion 80, and at least one belt 82, 84, 86, and/or 88 (82–88) or set of zero-degree wires 90 which encircle the tire tread and are provided to restrict the radially outward growth of the tread belt 12. It is preferred that the one or more belts have low circumferential hoop stiffness (increased flexibility) obtained when a majority of the reinforcement belt angles are high, i.e. greater than 22 degrees. The placement and shape of the wires 90 and/or the belts 82–86 are the subject of other patents, and are not critical to the method of this invention.

An optional feature of the tread belt 12 embodiment illustrated in FIG. 1 comprises one or more annular lands 72 and one or more annular grooves 74 in the underside or inner circumferential surface 70 of the tread belt 12 that interlock with corresponding grooves 78 and lands 76 of the tire carcass 14 to restrain the tread belt 12 from lateral or axial movement with respect to the carcass 14.

Until the recent advent of increasingly larger "very large" pneumatic tires, there was very little perceived need for removable tread belt versions of these tires. The present invention has identified a new category of problems related to the very large tires, and provides methods for shipping, storing, and changing of very large tires which utilize removable tread belt tire designs to address the shipping, storing, and changing problems which are unique to these tires.

Method of Shipping Very Large Tires

When pneumatic tires become so large that they cannot be shipped by conventional means, the shipping method of this invention is to utilize removable tread belt tires (e.g., 10), and to ship the tire tread belt 12 separately from the tire carcass 14. Regardless of how they are prepared for shipping, the action by itself of separating the tread belt 12 from the carcass 14 produces significant shipping weight and size reductions. For the example illustrated in FIG. 1, the overall tire diameter decreases from a whole tire OD of approximately 162 inches to approximately 142 inches for the outside diameter of the tire carcass 14. Likewise, the weight of 16,000 pounds for the whole tire is separated into an approximately 8,000 pound carcass 14 and an approximately 8.000 pound tread belt 12.

The separate tread belt 12 can be compressed into various smaller dimensions when prepared for shipping. A preferred embodiment 200 is illustrated in FIG. 2, wherein the tread belt 12 is diametrically compressed and held in the compressed state by one or more straps 210 (210*a*, 210*b*) made of steel or other suitable shipping strap material such as plastic, fabric, rope, or chains. To prevent collapse of the tread belt 12 and potential damage of the belt due to overly sharp bending of the ends 212*a* and 212*b*, one or more spacers 220 are positioned at each respective end 212*a*,212*b* inside the tread belt 12. The straps 210*a*, 210*b* hold the tread belt 12 compressed against an opposite side of the belt. The spacer 220 is preferably circular in cross-sectional shape, and is constructed by known techniques and using materials suitable to support the weight and shipping forces of the tread belt 12 during shipping. For example, wood or metal constructions, or plastic pre-forms could be used, providing the spacer does not have any sharp edges which could damage a surface of the tread belt 12. The dimensions of the spacer are such as will maintain support of the tread belt 12, typically on the order of about twenty-four (24) inches in diameter, depending upon the belt size.

Since tread belts 12 consume much less storage space than carcasses 14, the use of removable tread belt tire designs for very large tires presents significant advantages in storage. These advantages carry over into inventory cost savings and shipping cost savings as well, since tread belts 12 are less costly to both purchase and ship compared to carcasses 14 and to conventional very large tires.

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method of shipping a pneumatic tire, wherein the tire comprises an inflatable tire carcass and a removable tread belt surrounding the tire carcass and conforming to the tire carcass when the tire carcass is inflated; the method comprising the steps of:

shipping the removable tread belt separately from the tire carcass; and wherein the tread belt has two opposite sides, placing a spacer inside the tread belt, and holding the two opposite sides of the tread belt in mating engagement with each other during shipping.

2. The Method of claim 1 further comprising the step of:

securing the tread belt so that the two opposite sides of the tread belt are held against the spacer.

\* \* \* \* \*